US012228442B2

(12) United States Patent
Schwenter et al.

(10) Patent No.: US 12,228,442 B2
(45) Date of Patent: Feb. 18, 2025

(54) CORIOLIS MEASURING TRANSMITTER AND CORIOLIS MEASURING DEVICE

(71) Applicant: Endress+Hauser Flowtec AG, Reinach (CH)

(72) Inventors: Benjamin Schwenter, Ettingen (DE); Marc Werner, Grenzach-Wyhlen (DE); Markus Schütz, Lampenberg (CH); Vivek Kumar, Allschwil (CH); Mattia Alioli, Binningen (CH)

(73) Assignee: Endress+Hauser Flowtec AG, Reinach (CH)

( * ) Notice: Subject to any disclaimer, the term of this patent is extended or adjusted under 35 U.S.C. 154(b) by 233 days.

(21) Appl. No.: 18/057,301

(22) Filed: Nov. 21, 2022

(65) Prior Publication Data

US 2023/0168116 A1 Jun. 1, 2023

(30) Foreign Application Priority Data

Nov. 24, 2021 (EP) .................................... 21210281

(51) Int. Cl.
*G01F 1/84* (2006.01)
*G01N 9/32* (2006.01)

(52) U.S. Cl.
CPC .......... *G01F 1/8477* (2013.01); *G01F 1/8427* (2013.01); *G01N 9/32* (2013.01)

(58) Field of Classification Search
CPC ...... G01F 1/8409; G01F 1/8427; G01F 1/845; G01F 1/8477; G01F 1/8486; G01F 1/8495; G01F 15/18; G01F 1/8422; G01F 1/8431; G01F 1/849; G01F 1/74; G01F 1/84; G01F 25/10; G01F 1/8404; G01F 1/8472; G01F 1/8481; G01N 9/32
See application file for complete search history.

(56) References Cited

U.S. PATENT DOCUMENTS 6,807,868 B1 * 10/2004 Nakao .................. G01F 1/8413 73/861.355
6,895,826 B1 * 5/2005 Nakao .................. G01F 1/8409 73/861.355

FOREIGN PATENT DOCUMENTS

| | | | |
|---|---|---|---|
| DE | 4026724 | A1 | 3/1992 |
| DE | 69938581 | T2 | 6/2009 |
| DE | 102019120339 | A1 | 1/2021 |
| EP | 601256 | A1 | 6/1994 |
| EP | 2048480 | A2 | 4/2009 |

* cited by examiner

*Primary Examiner* — John Fitzgerald
*Assistant Examiner* — Truong D Phan
(74) *Attorney, Agent, or Firm* — Christopher R. Powers; Endress+Hauser (USA) Holding, Inc.

(57) ABSTRACT

The present disclosure relates to a Coriolis measuring transmitter of a Coriolis measuring device for measuring a mass flow or a density of a medium flowing through a pipe, which includes: at least one pair of measuring tubes arranged to oscillate relative to each other, wherein each measuring tube includes a centrally arranged bend, at least one driver and at least two vibration sensors; two guiding devices, each including a fluid chamber with a first opening for connection with the pipe and second openings for each measuring tube for connection with the measuring tubes, wherein the guiding devices are each formed from multiple parts, for example, formed from two parts, wherein a first part forms a pipe connecting part, and wherein at least one second part forms a measuring tube connecting part.

17 Claims, 5 Drawing Sheets

21.2
22
21
20.01
21.1
22
22.2
20.02
22.1
20.01

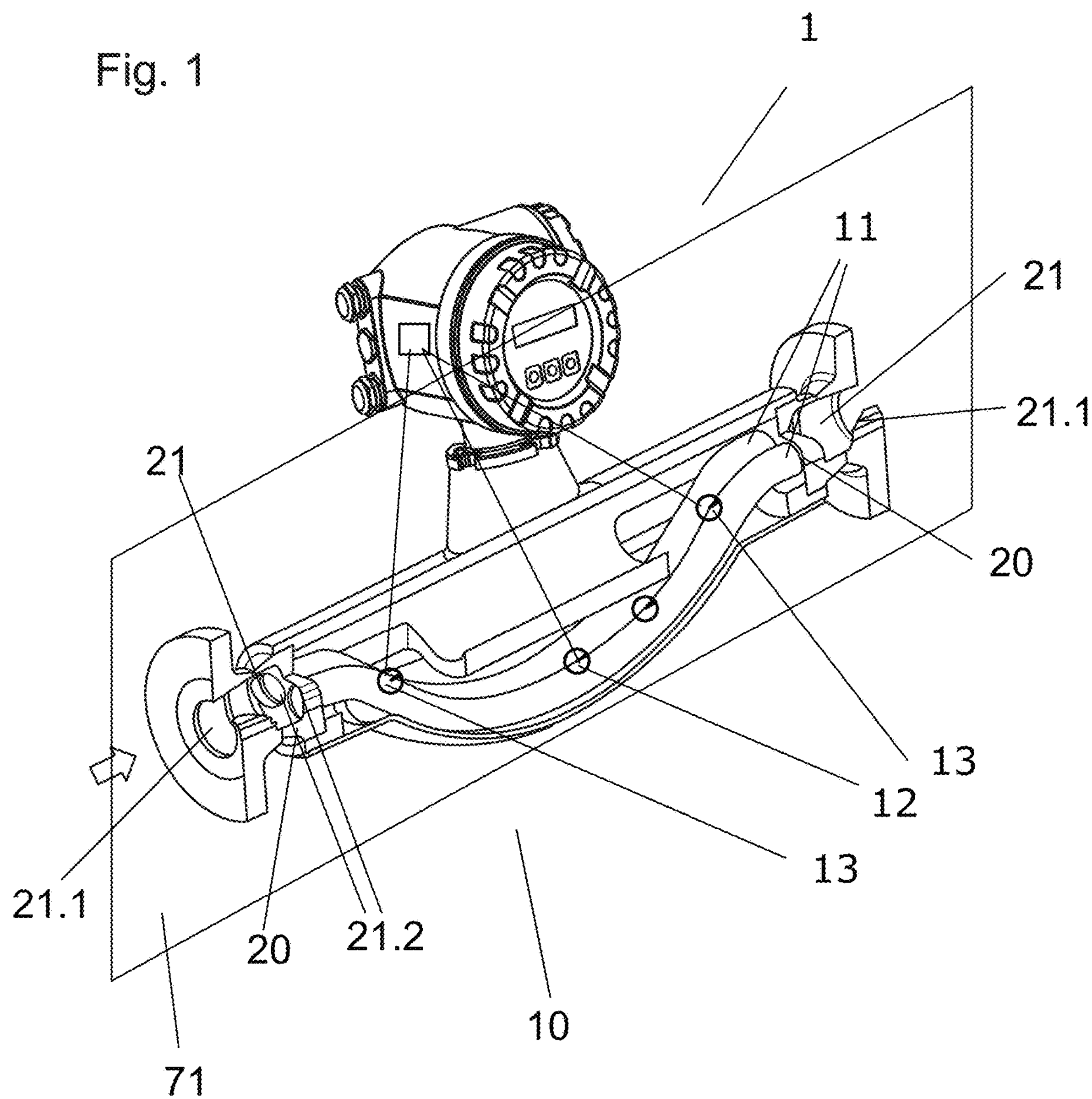
PRIOR ART

CORIOLIS MEASURING TRANSMITTER AND CORIOLIS MEASURING DEVICE

CROSS-REFERENCE TO RELATED APPLICATION

The present application is related to and claims the priority benefit of European Patent Application No. 21210281.8, filed on Nov. 24, 2021, the entire contents of which are incorporated herein by reference.

TECHNICAL FIELD

The present disclosure relates to a Coriolis measuring transmitter of a Coriolis measuring device arranged for measuring a property of a medium such as density or mass flow and to such a Coriolis measuring device.

BACKGROUND

Conventional Coriolis measuring transmitters are well known; they provide at least one measuring tube, drivers for oscillating the measuring tube and sensors for measuring the oscillations. In case of a multitude of measuring tubes, such as a pair of measuring tubes, a flow splitter is arranged to guide the medium from the pipe to the multitude of measuring tubes, see for example, the patent application DE102019120339A1.

However, due to constructional matters, flow splitters are designed with a level progression of the flow path. This leads to less compact Coriolis measuring transmitters and seriously limits flow path optimizations.

SUMMARY

The object of the present disclosure is to provide a robust and compact Coriolis measuring transmitter. The object is achieved by a Coriolis measuring transmitter and by a Coriolis measuring device according to the present disclosure.

The Coriolis measuring device is connected to a pipe system such that the medium passes through a measuring tube of the Coriolis measuring transmitter. According to at least one aspect of the present disclosure, a Coriolis measuring transmitter of a Coriolis measuring device for measuring a mass flow or a density of a medium flowing through a pipe according to the present disclosure comprises:

at least one pair of measuring tubes arranged to oscillate relative to each other, wherein each measuring tube comprises a centrally arranged bend, wherein in an equilibrium position the measuring tubes of a pair of measuring tubes are symmetrical with respect to a symmetry plane between both measuring tubes;

at least one driver to oscillate the measuring tubes and at least two sensors for measuring the oscillations of the measuring tubes; and two guiding devices arranged for guiding the medium from the pipe to the measuring tubes and vice versa, wherein each guiding device comprises a fluid chamber with a first opening for connection with the pipe and with a second opening for each measuring tube for connection with the measuring tubes, wherein the guiding devices are each formed from multiple parts, especially formed from two parts, wherein a first part forms a pipe connecting part, and wherein at least one second part forms a measuring tube connecting part, wherein in a projection of the fluid chamber onto the symmetry plane, the fluid chamber follows a chamber bend connecting a measuring tube volume with a pipe volume.

As the guiding devices comprise multiple parts, they allow for more complex design and non-even fluid chamber progression. In this way a flow optimization of the flow path may include more variables.

In an embodiment, the first part and the at least one second part are connected leak-tightly by an interface respectively, wherein the interface comprises a protrusion and a recess at least partially complementary to the projection. This allows for simple and robust assembly of the guiding device.

In an embodiment, the connection of the interface is secured by one of the following methods: screwing, locking, clicking, gluing, welding, bonding.

In an embodiment, the fluid chamber comprises a bifurcation with a first part and a second part, wherein within the first part each cross-section of the fluid chamber comprises a single coherent area with a single center of area, wherein within the second part each cross-section of the fluid chamber comprises two disconnected areas each corresponding to a measuring tube and each with a separate center of area, wherein a center line defined by a projection of the center of areas onto the symmetry plane confines an angle $\Theta$ and defines a radius $R_{CL}$, wherein a shape of each cross-section is characterized by two circles each comprising a center as well as a same radius R, wherein a separation S of the centers of the circles perpendicular to the symmetry plane and the radii R depend on $\Theta$ and follow following formula:

$$R(\Theta)=R_P*F_R(\Theta)$$

wherein R is a radial length measured from a center of area, $R_P$ is a scalar constant representing a pipe radius, $F_R$ is a monotonically non-increasing function with a maximum at $\Theta=0°$, and $S(\Theta)$ is monotonically non-decreasing function with a minimum at $\Theta=0°$.

The shape of the cross-sections depends on whether $\Theta$ has one coherent area or is split into two separate areas. In the case of a coherent area, both circles have a positive overlap with a maximum overlap at $\Theta=0$.

A deviation of a total area of a real cross-section from a total area of a cross-section as described with the circles is less than 5%, for example, less than 2% of the total area of a cross-section as described with the circles.

In an embodiment, the ratio of the length to the pipe radius is $1.8<R_{CL}R_P<2.4$, for example $1.9<R_{CL}/R_P<2.3$, and by further example, $2<R_{CL}/R_P<2.2$. This relation leads to less pressure drop of a flowing medium.

In an embodiment, the length is 16.5 mm$<R_{CL}<$20.5 mm, for example 17.5 mm$<R_{CL}<$19.5 mm, and by further example, 18 mm$<R_{CL}<$19 mm; and/or the pipe radius is 8.5 mm$<R_P<$9 mm, for example, 8.6 mm$<R_P<$8.9 mm, and by further example, 8.7 mm$<R_P<$8.8 mm. In this way a compact setup is achieved still allowing for sufficient medium flow.

In an embodiment, the bifurcation occurs at an angle $\Theta_B$ within an interval I of $\Theta$, wherein $45°<\Theta_B<75°$, for example, $50°<\Theta_B<70°$, and by further example, $55°<\Theta_B<65°$. In this way, the first bifurcated part and the second bifurcated part may have a well-optimized flow path.

In an embodiment, the monotonically non-increasing function is $F_R=-a*\Theta+1$ with $0.0031<a<0.0051$, for example, 0.0036<a<0.0046, and by further example, 0.0039<a<0.0043. This proved to be a particularly advantageous parameter range.

In an embodiment, the monotonically non-decreasing function is $S(\Theta)/R_P=b*0$ with 0.0109<|b|<0.0169, for example, 0.0129<|b|<0.0149, and by further example, 0.0134<|b|<0.0144. This proved to be a particularly advantageous parameter range.

In an embodiment, the length $R_{CL}$ defines an arc of a circle confining Θ with a radius of the length $R_{CL}$, wherein within cross-section planes projections of the center of area onto the symmetry plane deviate from the arc of a circle towards the center of the angle, wherein for 0 $<\Theta_C$ for a deviation y following is valid:

$$|y/R_P=c1*\Theta\bigcirc-c2*\Theta+c3,$$

wherein for Θ>Θc for the deviation y following is valid:

$$y/R_P=|c|*\Theta 2—c2*\Theta+c3,$$

wherein 0.000024<c1<0.000064, for example, 0.000034<c1<0.000054, and by further example, 0.000039<c1<0.000049; wherein 0.00577<c2<0.00977, for example, 0.00677<c2 <0.00877, and by further example, 0.00727<c2<0.00827; wherein 0.053<c3<0.093, for example, 0.063<c3<0.083, and by further example, 0.068<c3<0.078; and wherein 6° <Θc<15°, for example, $8°<\Theta_C<12°$, and by further example, $9°<\Theta_C<11°$.

These proved to be particularly advantageous parameter ranges.

According to a further aspect of the present disclosure, a Coriolis measuring device for measuring a mass flow or a density of a medium flowing through a pipe according to the present disclosure comprises:

a measuring transmitter according to the present disclosure; and an electronic circuit for operating driver and sensors and for providing measuring values for mass flow and/or density of the medium.

BRIEF DESCRIPTION OF THE DRAWINGS

In the following drawings, the present disclosure is described on the basis of exemplary embodiments, in which:

FIG. 1 shows a partial cut-away view of a Coriolis measuring device with a Coriolis measuring transmitter;

FIG. 1 shows an exemplary Coriolis measuring device 1 with a Coriolis measuring transmitter 10 for measuring a mass flow or a density of a medium flowing through a pipe 40 comprising at least one pair of measuring tubes 11 arranged to oscillate relative to each other, wherein each measuring tube comprises a centrally arranged bend.

Figure 2A:
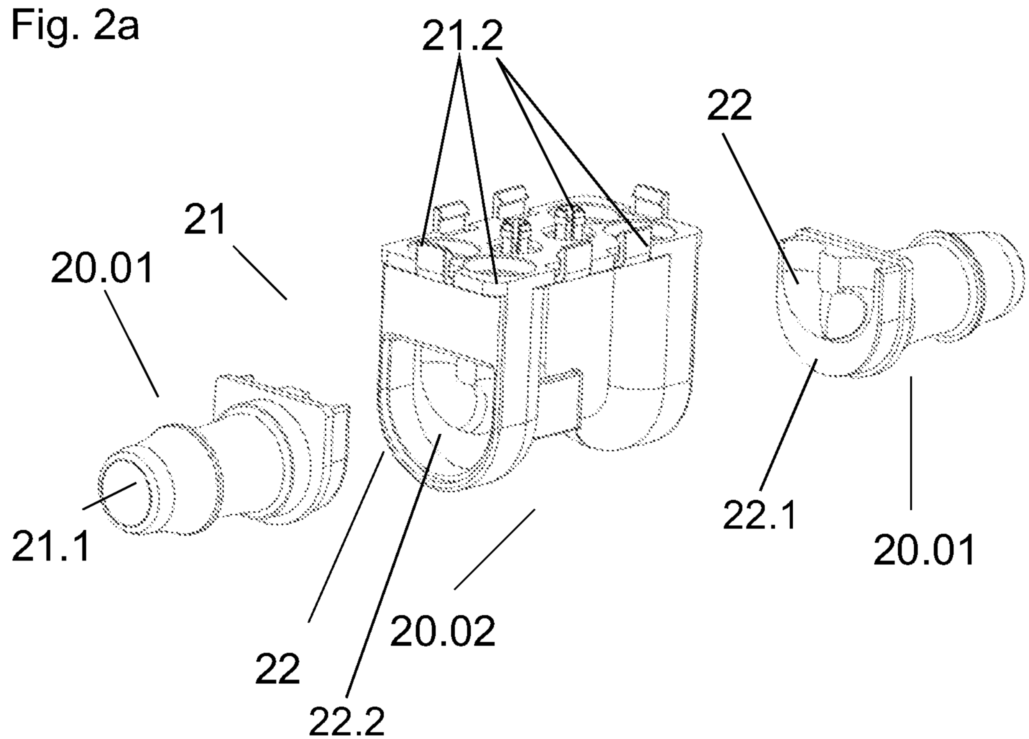
FIGS. 2*a* and 2*b* show perspective views of exemplary guiding device according to the present disclosure.

In an equilibrium position, the measuring tubes 11 of a pair of measuring tubes are symmetrical with respect to a symmetry plane 71 between both measuring tubes. At least one driver 12 is arranged to oscillate the measuring tubes, and at least two sensors 13 are arranged for measuring the oscillations of the measuring tubes. The oscillations cause deflections of the measuring tubes perpendicular to the symmetry plane 71.

Two guiding devices 20 are arranged for guiding the medium from a pipe 40 to the measuring tubes and vice versa, wherein each guiding device comprises a fluid chamber 21 with a first opening for connection 21.1 with the pipe 40 and with a second opening 21.2 for each measuring tube for connection with the measuring tubes. In FIG. 1, the guiding devices 20 are guiding devices according to the state of the art and designed with a level progression of the flow path. This design leads to less compact Coriolis measuring transmitters and seriously limits flow path optimizations.

Figure 2B:
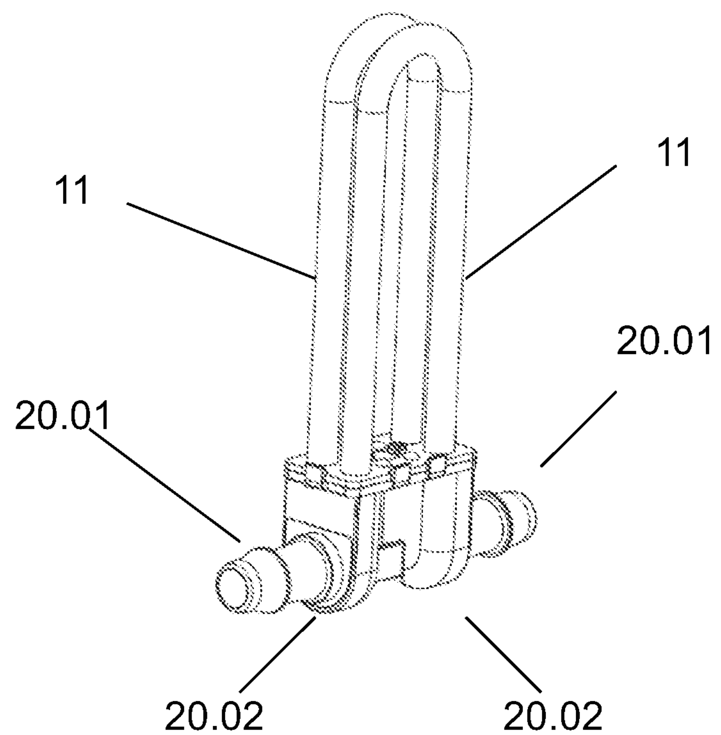

FIGS. 2*a* and 2*b* show perspective views of an exemplary guiding device according to the present disclosure, namely, an exploded view graphic in FIG. 2*a* and a joint part graphic including measuring tubes in FIG. 2*b*, wherein the guiding device 20 is formed from two parts, wherein a first part 20.01 forms a pipe connecting part, and wherein a second 20.02 part forms a measuring tube connecting part. As shown in FIGS. 2*a* and 2*b*, the second parts 20.02 may be formed from one piece; alternatively, they may also be formed from two separate pieces.

Figure 2C:
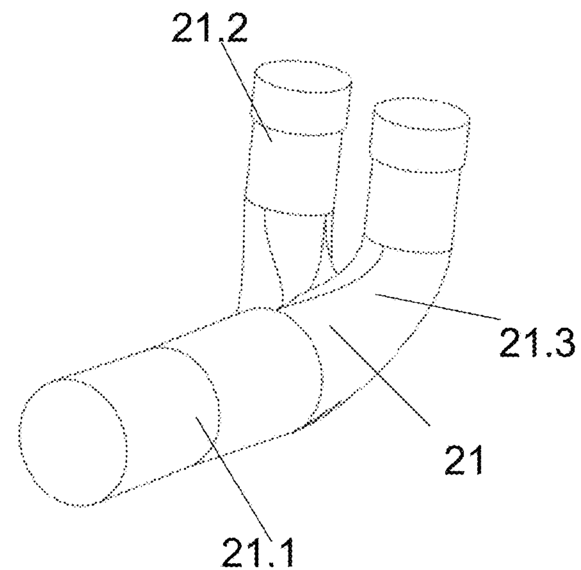
FIG. 2*c* shows an exemplary fluid chamber according to the present disclosure.
Figure 2D:
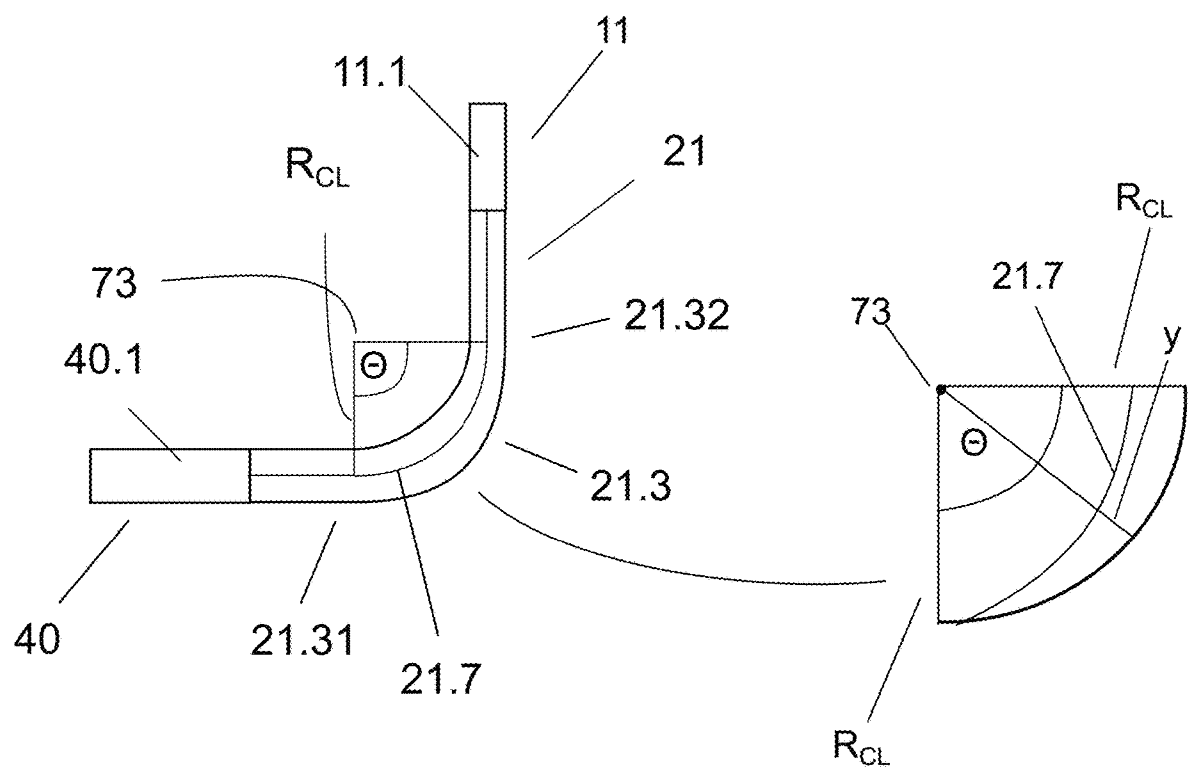
FIG. 2*d* illustrates a schematic projection of the fluid chamber onto a symmetry plane.

In a projection of the fluid chamber onto the symmetry plane 71, the fluid chamber follows a chamber bend 21.3 connecting a measuring tube volume 11.1 with a pipe volume 40.1, see also FIG. 2*d*. The guiding device may alternatively also be formed from more than two parts. First part 20.01 and second part 20.02 are connected via an interface 22 comprising a protrusion 22.1 and a corresponding recess 22.2, such that a leak-tight connection is arranged. As shown here the protrusion 22.1 can be part of the first part 20.01, and the recess can be part of the second part. However, alternatively, the protrusion 22.1 can be part of the second part 20.02, and the recess can be part of the first part 20.01.

FIG. 2*c* shows an exemplary fluid chamber 21 within a guiding device according to the present disclosure with a first opening for connection 21.1 with the pipe 40 and with a second opening 21.2 for each measuring tube for connection with the measuring tubes, wherein according to the present disclosure the fluid chamber follows a chamber bend 21.3 connecting a measuring tube volume 11.1 with a pipe volume 40.1, see also FIG. 2*d*.

FIG. 2*d* shows a projection of a fluid chamber 21 according to the present disclosure onto the symmetry plane 71. A center line 21.7 of the chamber bend 21.3 defined by a projection of the center of areas of cross-sections of the fluid chamber onto the symmetry plane confines an angle Θ and defines a length $R_{CL}$ at Θ=0° from a center 73 of the angle to the center line. Length $R_{CL}$ defines an arc of a circle 74 confining 0 with a radius of the length $R_{CL}$. In an embodiment, in cross-section planes 72 projections of the center of area 21.51, 21.61 onto the symmetry plane 71 deviate from the arc of a circle towards the center of the angle 73; therefore, the center line 21.7 deviates from the arc of a circle towards a center 73 of the angle Θ, which at the same time is a center of the arc of a circle. The deviation takes a value y dependent on angle Θ.

The chamber bend has a start of the chamber bend 21.31 with Θ=0° facing the pipe 40 and an end of the chamber bend 21.32 facing a corresponding measuring tube. In that way, the guiding device may be formed in a compact manner with low flow resistance.

Figure 3A:
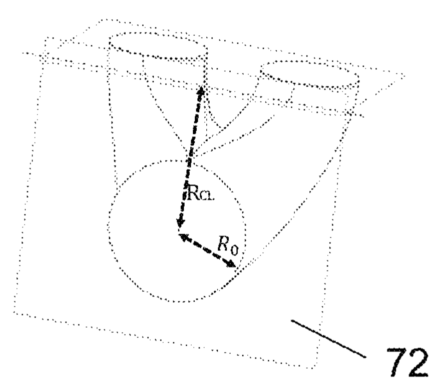
FIG. 3*a* shows a perspective view of an exemplary fluid chamber according to the present disclosure.

FIG. 3*a* shows a cross-sectional perspective view of a fluid chamber according to the present disclosure illustrating geometric parameters radius R of circles characterizing cross-sections of the fluid chamber in corresponding cross-section planes 72 and a length $R_{CL}$ at $\Theta=0°$ between the center line and the center of angle $\Theta$.

Figure 3B:
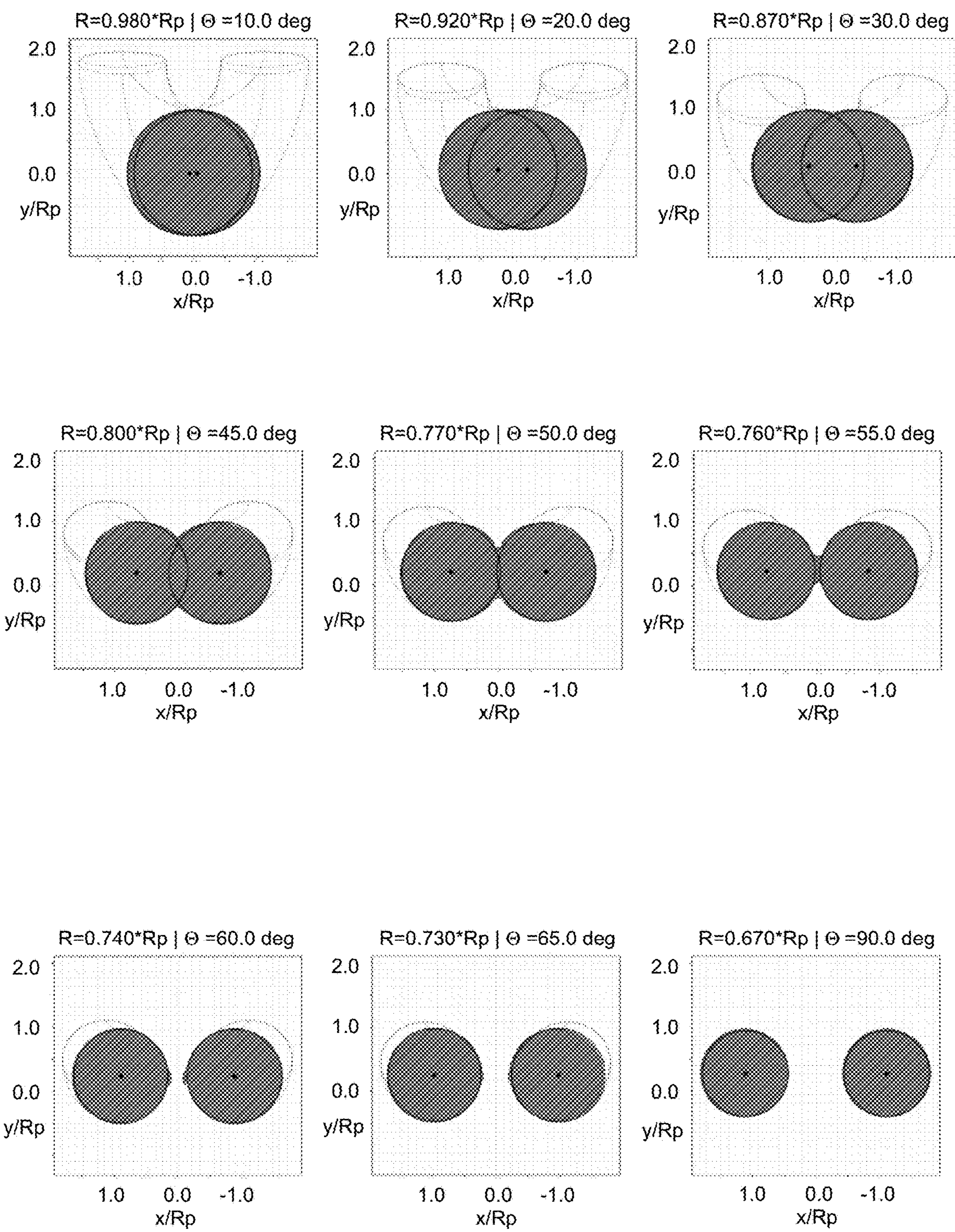
FIG. 3*b* shows multiple cross-sections of the exemplary fluid chamber of FIG. 3*a*.

FIG. 3*b* shows a progression of cross-sections of an exemplary fluid chamber according to the present disclosure with increasing values of $\Theta$, wherein radii of circles decrease monotonically with increasing $\Theta$ and wherein a separation of centers of the circles increases monotonically with increasing $\Theta$.

With $\Theta=0$ both circles overlap entirely and $R=R_P$. With increasing $\Theta$, the overlap decreases until at roughly $\Theta=55°$ the overlap becomes 0. From this point both circles are separated, such that a bifurcation of the cross-section takes place.

In an embodiment, the ratio of the length to the pipe radius is $1.8<R_{CL}/R_P<2.4$, for example, $1.9<R_{CL}/R_P<2.3$, and by further example, $2<R_{CL}/R_P<2.2$.

In an embodiment, the length is 16.5 mm$<R_{CL}<$20.5 mm, for example, 17.5 mm$<R_{CL}<$19.5 mm, and by further example, 18 mm$<R_{CL}<$19 mm, and/or the pipe radius is 8.5 mm$<R_P<$9 mm, for example, 8.6 mm$<R_P<$8.9 mm, and by further example, 8.7 mm$<R_P<$8.8 mm. In this way a compact setup is achieved still allowing for sufficient medium flow.

In an embodiment the bifurcation occurs at an angle $\Theta_B$ within an interval I of $\Theta$, wherein $45°<\Theta_B<75°$, for example, $50°<\Theta_B<70°$, and by further example, $55°<\Theta_B<65°$. In this way, the first bifurcated part and the second bifurcated part may have a well optimized flow path.

In an embodiment, the monotonically non-increasing function is $F_R=-a*\Theta+1$ with $0.0031<a<0.0051$, for example, $0.0036<a<0.0046$, and by further example, $0.0039<a<0.0043$. This proved to be a particularly advantageous parameter range.

In an embodiment, the monotonically non-decreasing function is $S(\Theta)/R_P=b*\Theta$ with $0.0109<|b|<0.0169$, for example, $0.0129<|b|<0.0149$, and by further example, $0.0134<|b|<0.0144$. This proved to be a particularly advantageous parameter range.

In the progression of the fluid chamber 21, there is a critical angle $\Theta_C$ about which the flow behavior changes. In an embodiment, the length $R_{CL}$ defines an arc of a circle confining $\Theta$ with a radius of the length $R_{CL}$, wherein within cross-section planes projections of the center of area onto the symmetry plane deviate from the arc of a circle towards the center of the angle, wherein for $\Theta<\Theta_C$ for a deviation y following is valid:

$$|y/R_P|<0.01,$$

wherein for $\Theta>\Theta_C$ for the deviation y following is valid:

$$y/R_P=|c1*\Theta 2-c2*\Theta+c3|,$$

wherein $0.000024<c\mathbf{1}<0.000064$, for example, $0.000034<c\mathbf{1}<0.000054$, and by further example, $0.000039<c\mathbf{1}<0.000049$; wherein $0.00577<c\mathbf{2}<0.00977$, for example, $0.00677<c\mathbf{2}<0.00877$, and by further example, $0.00727<c\mathbf{2}<0.00827$; wherein $0.053<c\mathbf{3}<0.093$, for example, $0.063<c\mathbf{3}<0.083$, and by further example, $0.068<c\mathbf{3}<0.078$; and wherein $6°<\Theta_C<15°$, for example, $8°<\Theta_C<12°$, and by further example, $9°<\Theta c<11°$.

These proved to be particularly advantageous parameter ranges.

The invention claimed is:

1. A Coriolis measuring transmitter of a Coriolis measuring device for measuring a mass flow or a density of a medium flowing through a pipe, the measuring transmitter comprising:

at least one pair of measuring tubes arranged to oscillate relative to each other, wherein each measuring tube includes a central bend, wherein in an equilibrium position, the measuring tubes of the at least one pair of measuring tubes are symmetrical with respect to a symmetry plane extending between both measuring tubes;

at least one driver configured to oscillate the measuring tubes;

at least two sensors configured to measure the oscillations of the measuring tubes; and two guiding devices configured and arranged to guide the medium, wherein one guiding device is configured and arranged to guide the medium from the pipe into each measuring tube, and wherein the other guiding device is configured and arranged to guide the medium from each measuring tube into a continuation of the pipe, wherein each guiding device comprises a fluid chamber with a first opening configured to connect to the pipe and with second openings for each measuring tube, the second openings each configured to connect to a measuring tube of the at least one pair of measuring tubes, wherein each guiding device comprises multiple parts, wherein a first part is configured to connect to the pipe and wherein at least one second part is configured to connect to the measuring tubes of the at least one pair of measuring tubes, wherein in a projection of the fluid chamber onto the symmetry plane, the fluid chamber follows a chamber bend connecting a measuring tube volume with a pipe volume, and wherein the first part and the at least two second parts are connected together leak-tightly by a corresponding interface, wherein each interface comprises a protrusion and a recess at least partially complementary to the projection.

2. The measuring transmitter of claim 1, wherein each guiding device comprises two parts, the first part and a second part of the at least one second part.

3. The measuring transmitter of claim 1, wherein the connection of the interface is secured by one of screwing, locking, clicking, gluing, welding, bonding, sintering and brazing.

4. The measuring transmitter of claim 1, wherein the fluid chamber comprises a bifurcation including a first bifurcated part and a second bifurcated part, wherein within the first bifurcated part each cross-section of the fluid chamber defines a single coherent area having a single center of area, wherein within the second bifurcated part each cross-section of the fluid chamber defines two disconnected areas, each corresponding to an associated measuring tube of the at least one measuring tube pair and each with a separate center of area, wherein a center line is defined by a projection of the centers of area of the cross-sections of the second bifurcated part onto the symmetry plane, wherein a section of the center line, which coincides with the chamber bend, confines an angle, $\Theta$, and defines a length, $R_{CL}$, at $\Theta=0°$ from a center of the angle to the center line, wherein a start of the chamber bend where $\Theta=0°$ is adjacent the pipe, and wherein an end of the chamber bend is adjacent a corresponding measuring tube, wherein a shape of each cross-section is characterized by two circles each having a center and a same radius, wherein a separation ($S(\Theta)$) of the centers of the circles perpendicular to the symmetry plane is a monotonically non-decreasing function with a minimum at Θ=0° that depends on the angle, and wherein the radius depends on the angle as defined by:

$$R(\Theta)=R_P*F_R(\Theta),$$

wherein R(Θ) is a radial length measured from a center of area, $R_P$ is a scalar constant representing a pipe radius, and $F_R(\Theta)$ is a monotonically non-increasing function with a maximum at Θ=020 , and wherein cross-section planes defined by the cross-sections comprise the center of the angle.

5. The measuring transmitter of claim 4, wherein a ratio of the length to the pipe radius is $1.8<R_{CL}/R_P<2.4$.

6. The measuring transmitter of claim 5, wherein the ratio of the length to the pipe radius is $2<R_{CL}/R_P<2.2$.

7. The measuring transmitter of claim 4, wherein the length is 16.5 mm$<R_{CL}<$20.5 mm, and/or the pipe radius is 8.5 mm$<R_P<$9 mm.

8. The measuring transmitter of claim 7, wherein the length is 18 mm$<R_{CL}<$19 mm, and/or the pipe radius is 8.7 mm$<R_P<$8.8 mm.

9. The measuring transmitter of claim 4, wherein the bifurcation occurs at a bifurcation angle greater than 45° and less than 75°.

10. The measuring transmitter of claim 9, wherein the bifurcation angle is greater than 55° and less than 65°.

11. The measuring transmitter of claim 4, wherein the monotonically non-increasing function is defined by:

$$F_R(\Theta)=-a*\Theta+1,$$

wherein 0.0031<a<0.0051.

12. The measuring transmitter of claim 11, wherein 0.0039<a<0.0043.

13. The measuring transmitter of claim 4, wherein a ratio of the monotonically non-decreasing function to the pipe radius is defined by:

$$S(\Theta)/R_P=b*\Theta,$$

wherein 0.0109<|b|<0.0169.

14. The measuring transmitter of claim 13, wherein 0.0134<|b|<0.0144.

15. The measuring transmitter of claim 4, wherein the length defines an arc of a circle confining the angle with a radius of the length, wherein within cross-sectional planes, projections of individual centers of area onto the symmetry plane deviate from the arc of a circle towards the center of the angle by a deviation, wherein for angles less than a critical angle, an absolute value of a ratio of the deviation to the pipe radius is less than 0.01, wherein for angles greater than the critical angle, the ratio of the deviation to the pipe radius is:

$$y/R_P=|c1*\Theta\wedge 2-c2*\Theta+c3|,$$

wherein 0.000024<c1<0.000064, wherein 0.00577<c2<0.00977, wherein 0.053<c3 <0.093 and wherein $6°<\Theta_C<15°$.

16. The measuring transmitter of claim 15, wherein 0.000039<c1<0.000049, wherein 0.00727<c2<0.00827, wherein 0.068<c3<0.078 and wherein $9°<\Theta_C<11°$.

17. A measuring device for measuring a mass flow or a density of a medium flowing through a pipe, the measuring device comprising:

the measuring transmitter according to claim 1; and an electronic circuit configured to operate the at least one driver and the at least two sensors and to generate measuring values for the mass flow and/or the density of the medium.

* * * * *